(12) United States Patent
Kim et al.

(10) Patent No.: US 11,418,691 B2
(45) Date of Patent: Aug. 16, 2022

(54) ELECTRONIC DEVICE INCLUDING FLEXIBLE DISPLAY

(71) Applicant: Samsung Display Co., Ltd., Yongin-Si (KR)

(72) Inventors: Tae-Chang Kim, Anyang-si (KR); Chanhui Han, Seongnam-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 17/325,756

(22) Filed: May 20, 2021

(65) Prior Publication Data

US 2022/0046153 A1 Feb. 10, 2022

(30) Foreign Application Priority Data

Aug. 4, 2020 (KR) .................. 10-2020-0097350

(51) Int. Cl.
*H04N 5/225* (2006.01)
*G06F 1/16* (2006.01)
*H04N 5/232* (2006.01)

(52) U.S. Cl.
CPC ......... *H04N 5/2257* (2013.01); *G06F 1/1652* (2013.01); *G06F 1/1686* (2013.01); *H04N 5/23299* (2018.08)

(58) Field of Classification Search
CPC .... G06F 1/1652; G06F 1/1686; G06F 1/1624; G06F 1/1637; H04N 5/23299; H04N 5/2257; H04M 1/0264; H04M 1/0268
See application file for complete search history.

(56) References Cited

U.S. PATENT DOCUMENTS

2019/0317550 A1* 10/2019 Kim ................ H04N 5/2252

FOREIGN PATENT DOCUMENTS

| EP | 1551157 A1 * | 7/2005 | .......... H04M 1/0237 |
|----|--------------|--------|----------------------|
| EP | 1553749 A1 * | 7/2005 | .......... H04M 1/0237 |
| KR | 10-2019-0101184 A | 8/2019 | |
| KR | 10-2019-0113128 A | 10/2019 | |
| KR | 10-2019-0119719 A | 10/2019 | |
| KR | 10-2106296 B1 | 5/2020 | |
| WO | 2019-198983 A1 | 10/2019 | |

* cited by examiner

*Primary Examiner* — Nelson D. Hernández Hernández
(74) *Attorney, Agent, or Firm* — Innovation Counsel LLP

(57) ABSTRACT

An electronic device includes a first plate, a second plate continuously moving between a first state and a second state with respect to the first plate, a camera module disposed between the first plate and the second plate and including a lens, a flexible display including a planar portion and a bendable portion, and a multi-joint module overlapping the bendable portion of the flexible display and including a plurality of segment members. A position of the camera module and a direction of the lens may be changed in response to a state transition of the electronic device. The plurality of segment members may include at least one opening segment member, and an opening is formed in the opening segment member. The opening segment member may be moved in response to a change in the position of the camera module and a change of the direction of the lens.

20 Claims, 15 Drawing Sheets

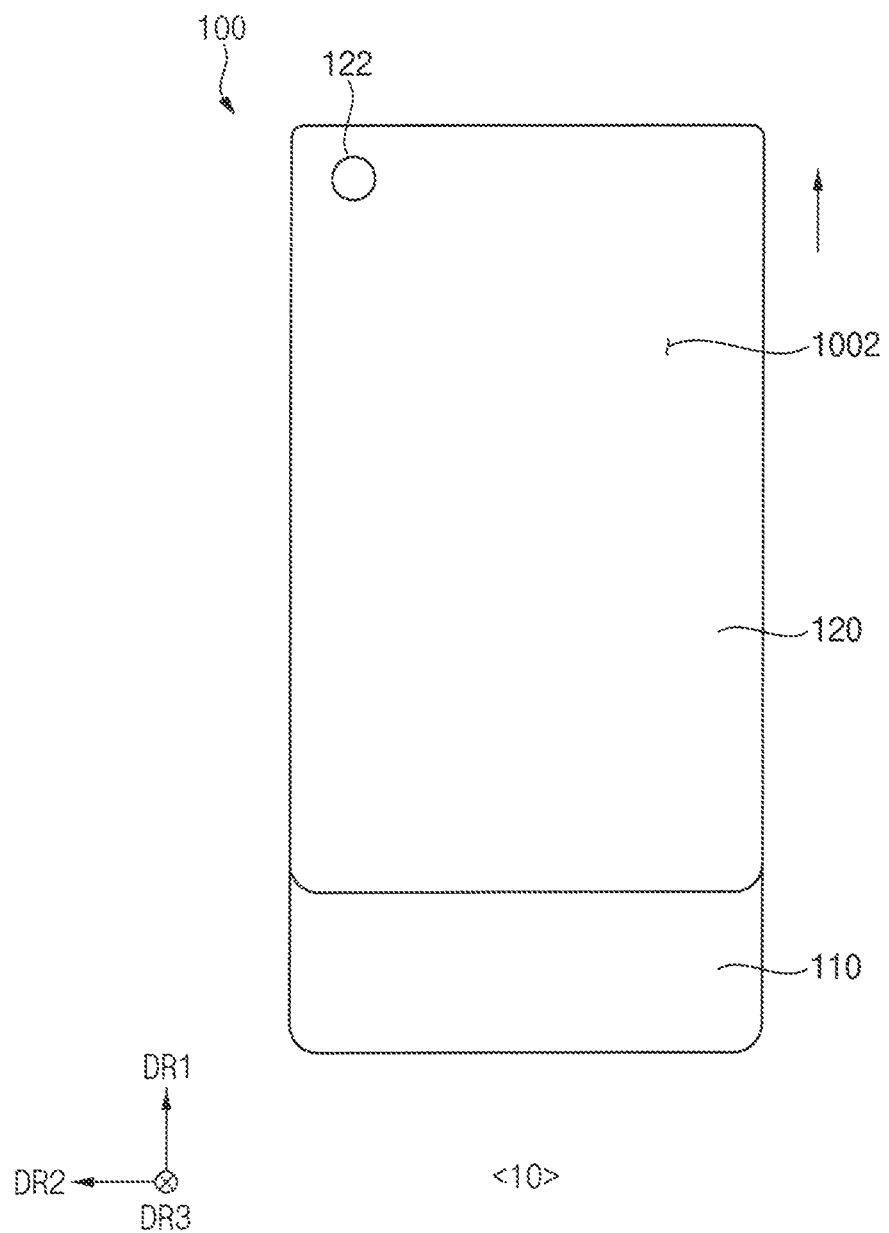

ELECTRONIC DEVICE INCLUDING FLEXIBLE DISPLAY

CROSS-REFERENCE TO RELATED APPLICATION(S)

This application claims priority from and the benefit of Korean Patent Application No. 10-2020-0097350, filed on Aug. 4, 2020, which is hereby incorporated by reference for all purposes as if fully set forth herein.

BACKGROUND

Field

The present disclosure relates to an electronic device including a flexible display. More particularly, the present disclosure relates to an electronic device capable of using a single camera module as a front camera and a rear camera.

Discussion of the Background

Due to the recent evolution of the information-oriented society, various demands for electronic devices to display moving and non-moving images are ever increasing. Electronic devices may include a screen such as liquid-crystal displays (LCDs), plasma display panels (PDPs), organic light-emitting displays (OLEDs), and micro light-emitting diode displays. Furthermore, electronic devices may include different modules to provide various functions or services. For example, the electronic devices may display an image through a screen or capture an image using a camera.

Recently, in order to improve the portability of an electronic device having a large screen, the electronic device including a flexible display has been proposed.

SUMMARY

Embodiments of the present disclosure provide an electronic device capable of using a single camera module as a front camera and a rear camera.

Embodiments of the present disclosure also provide an electronic device capable of using the entire area of a front display.

Additional features of the disclosure will be set forth in the description which follows, and in part will be apparent from the description, or may be learned by practice of the disclosure.

An electronic device according to an embodiment may include a first plate, a second plate facing the first plate and continuously moving between a first state and a second state with respect to the first plate, a camera module including a lens and disposed between the first plate and the second plate, a flexible display including a planar portion disposed on the first plate and a bendable portion extending from the planar portion, and a multi-joint module including a plurality of segment members and overlapping the bendable portion of the flexible display. The camera module may be configured to move in a first direction with respect to the first plate in response to a state transition of the second plate. The camera module may be configured to rotate in response to the state transition of the second plate such that the lens faces a front surface of the electronic device or a rear surface of the electronic device. The plurality of segment members may include at least one opening segment member, an opening may be formed in the opening segment member, and the opening segment member may overlap the lens in the first state and the second state.

According to an embodiment, the opening segment member may be configured to move in the first direction with respect to the first plate in response to the state transition of the second plate.

According to an embodiment, the camera module may be located at a first position in the first direction with respect to the first plate in the first state, and may be located at a second position in the first direction with respect to the first plate in the second state. The lens may face the rear surface of the electronic device in the first state, and may face the front surface of the electronic device in the second state.

According to an embodiment, the second position may be spaced apart from the first position by a spacing distance. The spacing distance may be a distance which the second plate moves with respect to the first plate when the second plate transits from the first state to the second state.

According to an embodiment, the opening segment member may be located at the first position in the first state, and may be located at the second position in the second state.

According to an embodiment, the opening segment member may be located on the rear surface of the electronic device, and may be located on the front surface of the electronic device.

According to an embodiment, the opening segment member may include a first opening segment member wherein a first opening may be formed in the first opening segment member, and a second opening segment member disposed adjacent to the first opening segment member, and a second opening may be formed in the second opening segment member.

According to an embodiment, a length of the first opening in the first direction may be less than a length of the first opening segment member in the first direction. A length of the second opening in the first direction may be less than a length of the second opening segment member in the first direction.

According to an embodiment, the opening segment member may include a first portion and a second portion spaced apart from the first portion. The opening may be located between the first portion and the second portion.

According to an embodiment, the multi-joint module further may include at least one support member disposed on the plurality of the segment members.

According to an embodiment, the plurality of segment members may be arranged in the first direction. The support member may extend in the first direction.

According to an embodiment, the support member may include a first support member overlapping the first portion of the opening segment member, and a second support member overlapping the second portion of the opening segment member.

According to an embodiment, one end of the first portion of the opening segment member may disposed adjacent to the opening surrounds the first support member. One end of the second portion of the opening segment member may disposed adjacent to the opening surrounds the second support member.

According to an embodiment, a first hole may be formed in the first support member includes. An end portion of the first portion of the opening segment member adjacent to the opening may be inserted into the first hole. A second hole may be formed in the second support member. An end portion of the second portion of the opening segment member adjacent to the opening may be inserted into the second hole.

According to an embodiment, the plurality of segment members may be arranged in the first direction.

According to an embodiment, each of the plurality of segment members may extend in a second direction substantially perpendicular to the first direction.

According to an embodiment, a thickness of the opening segment member in a third direction substantially perpendicular to the first direction and the second direction may be less than a thickness of a segment member of the segment members outside the opening segment member in the third direction.

According to an embodiment, the bendable portion of the flexible display may be located between the first plate and the second plate in the first state.

According to an embodiment, the second plate may include a first aperture overlapping the lens.

According to an embodiment, the bendable portion of the flexible display may include a second aperture overlapping the lens.

The electronic device according to embodiments may include the camera module including the lens. A position of the camera module and a direction of the lens may be changed in response to a state transition of the electronic device. Accordingly, image capturing of the front and rear of the electronic device may be performed using a single camera module.

The electronic device according to embodiments may further include the opening segment member overlapping the lens of the camera module and including the opening. The opening segment member may be moved in response to a change in the position of the camera module and a change of the direction of the lens. Accordingly, the opening may be formed only in some of the opening segment members among the plurality of segment members, so that cost and time required for forming the opening may be reduced.

The electronic device according to embodiments may include the aperture formed in a partial area of the flexible display and overlapping the camera module. The partial area of the flexible display may not be exposed to a front surface of the electronic device in a closed state, but may be exposed to the front surface of the electronic device only in an open state. Accordingly, the aperture and the camera module may not be exposed to the front surface of the electronic device in the closed state, but may be exposed to the front surface of the electronic device only in the open state.

It is to be understood that both the foregoing general description and the following detailed description are example and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this specification, illustrate embodiments of the present disclosure, and together with the description serve to explain the present disclosure.

FIGS. 2A and 2B are rear views illustrating an electronic device according to an embodiment.

DETAILED DESCRIPTION

Illustrative, non-limiting embodiments will be more clearly understood from the following detailed description in conjunction with the accompanying drawings.

Figure 1A:
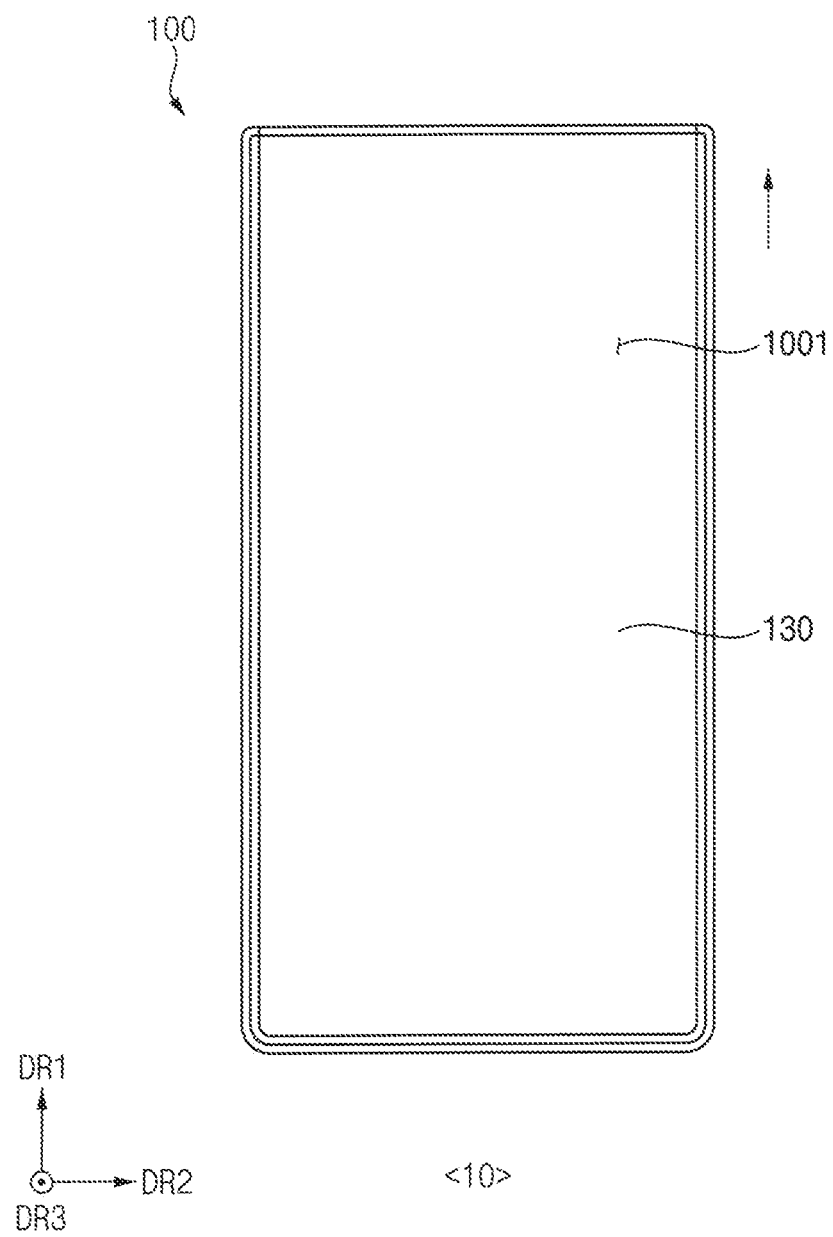
FIGS. 1A and 1B are front views illustrating an electronic device according to an embodiment.
Figure 1B:
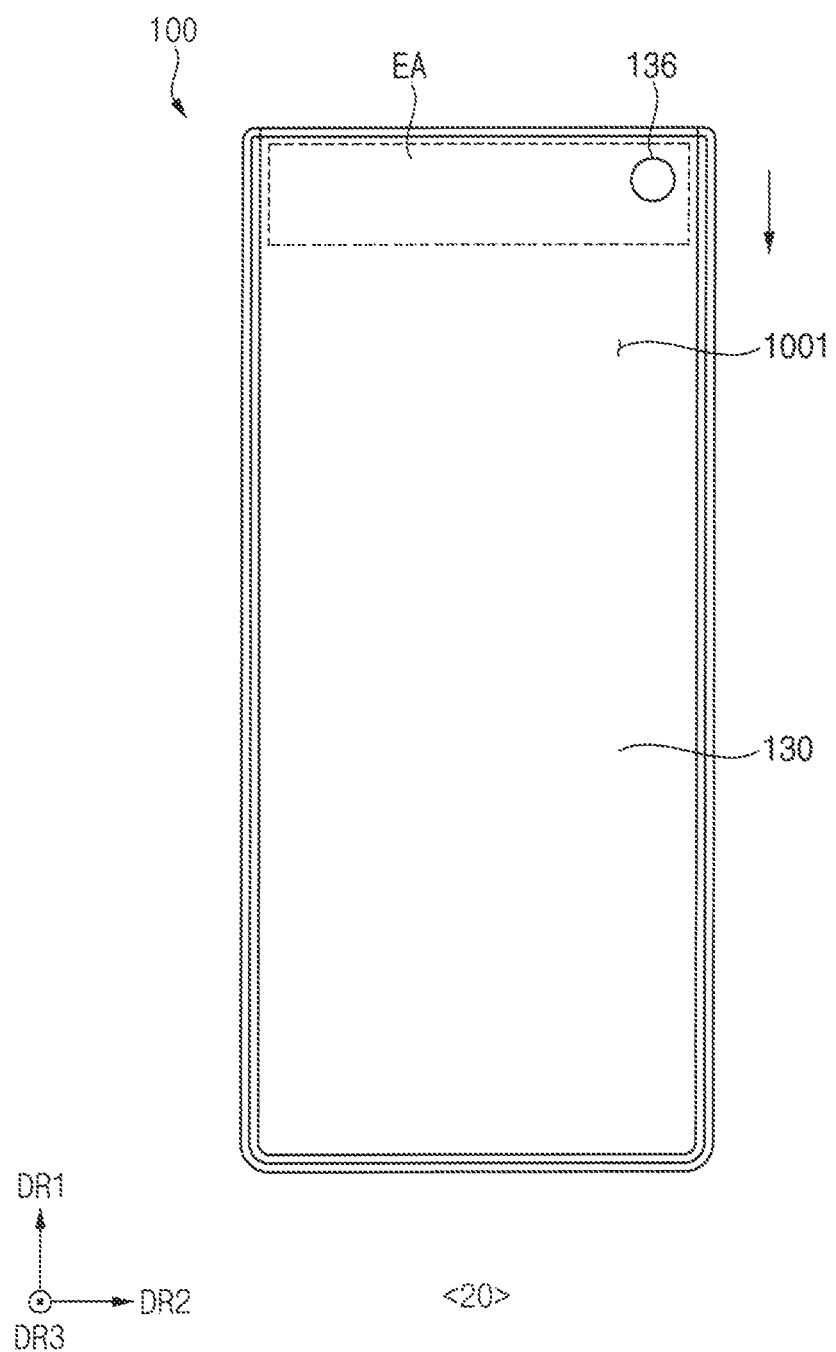
Figure 2B:
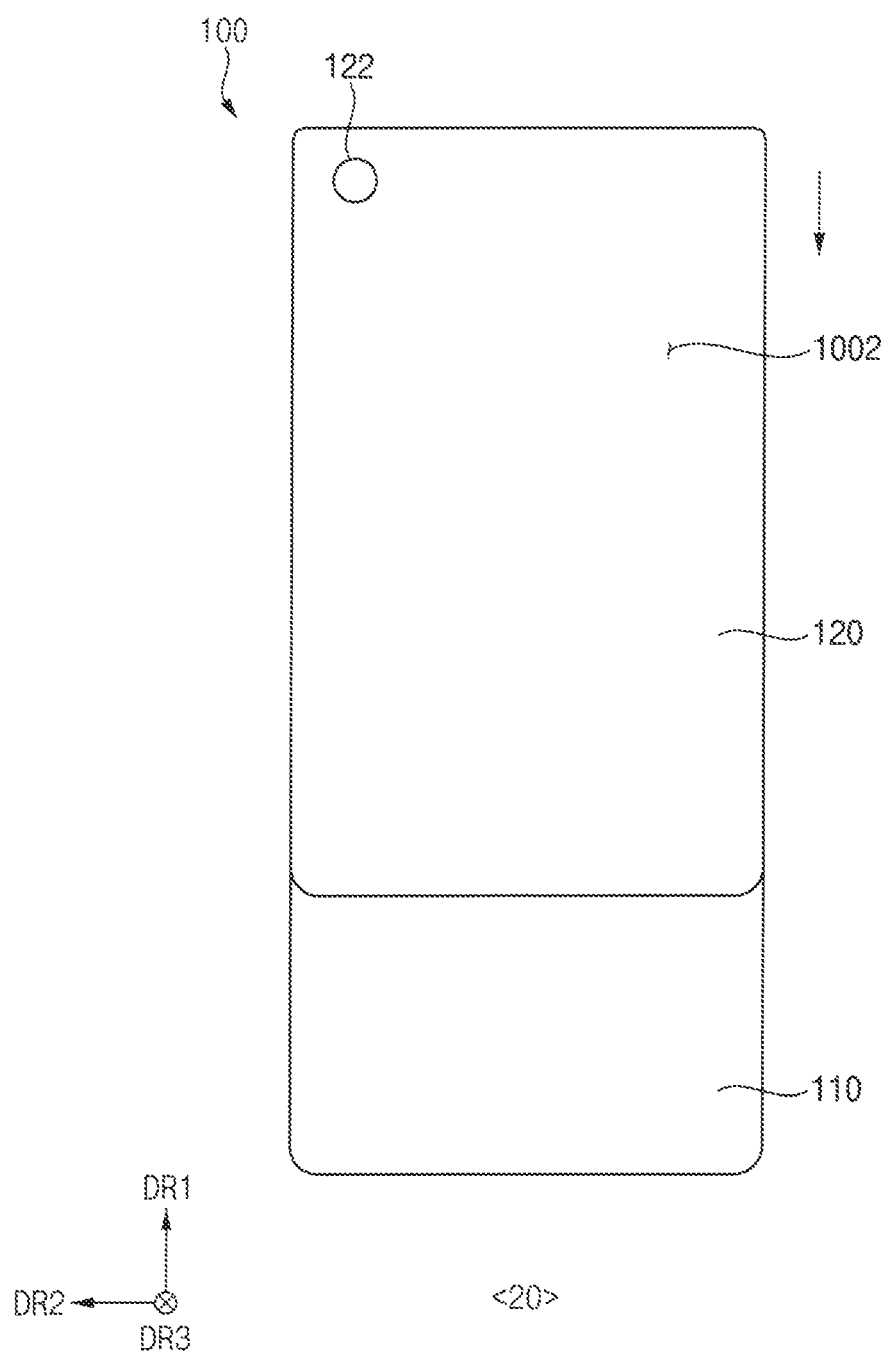
Figure 3A:
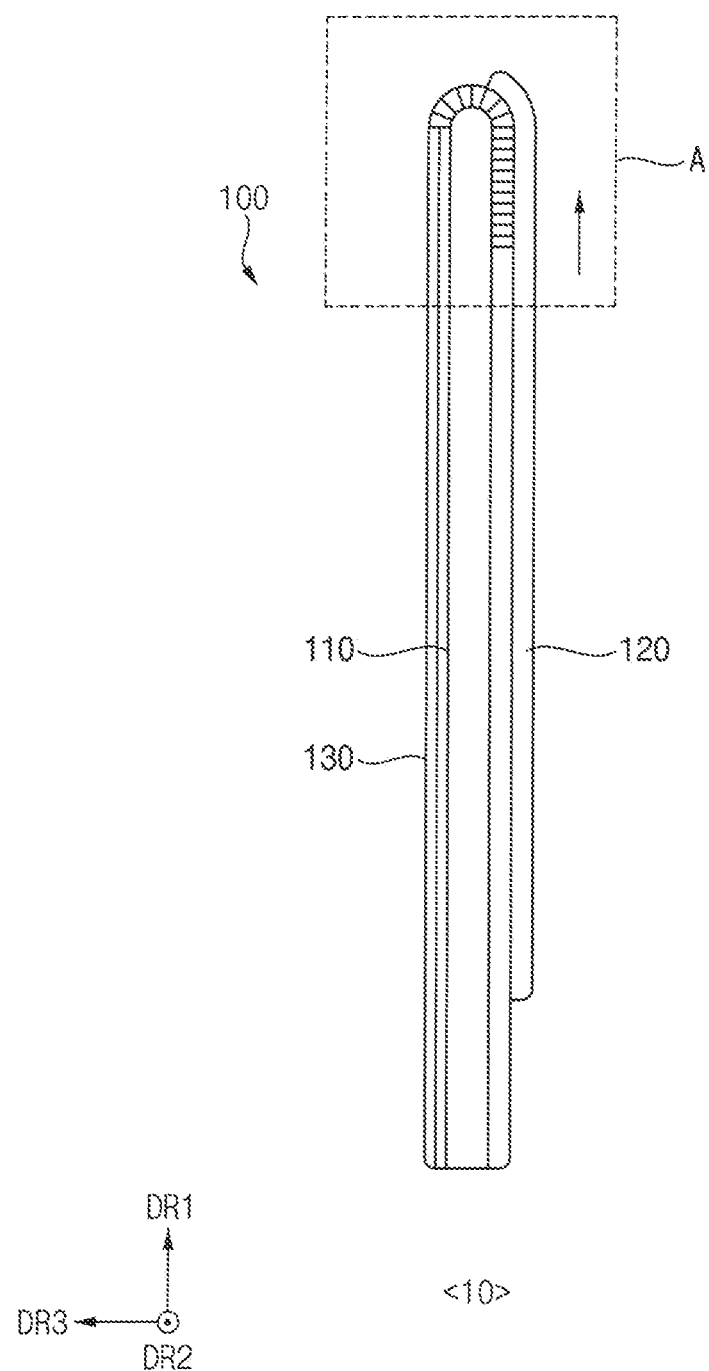
FIGS. 3A and 3B are side views illustrating an electronic device according to an embodiment.
Figure 3B:
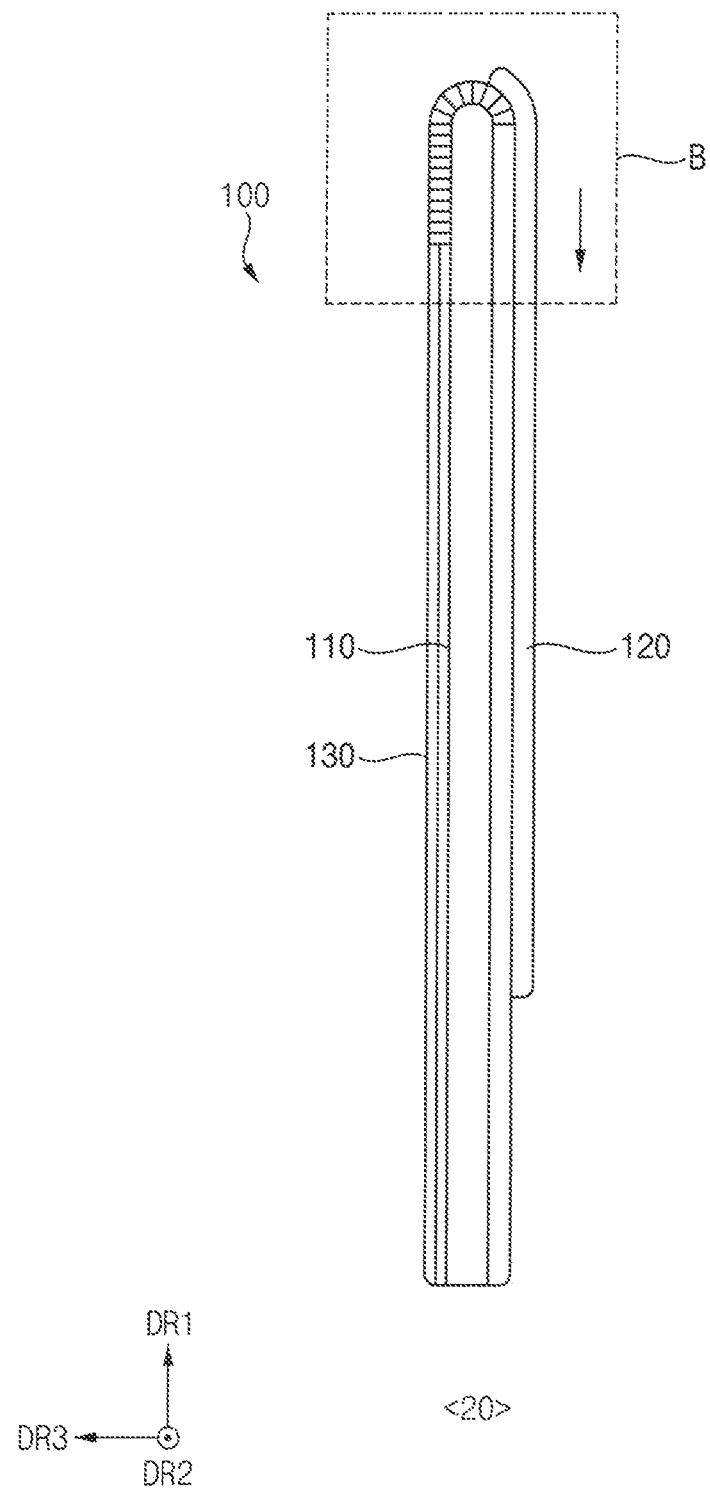
Figure 4:
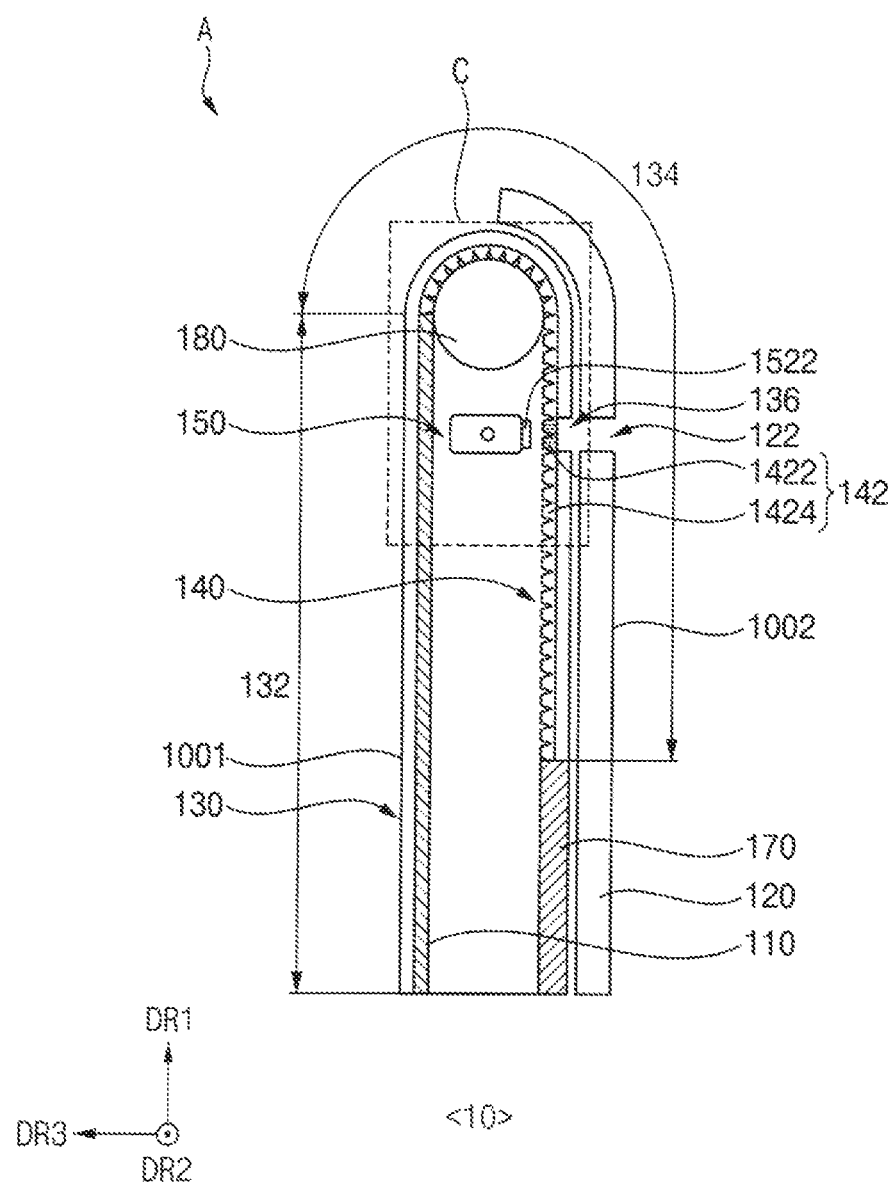
FIG. 4 is an enlarged cross-sectional view illustrating an area "A" of FIG. 3A.
Figure 5:
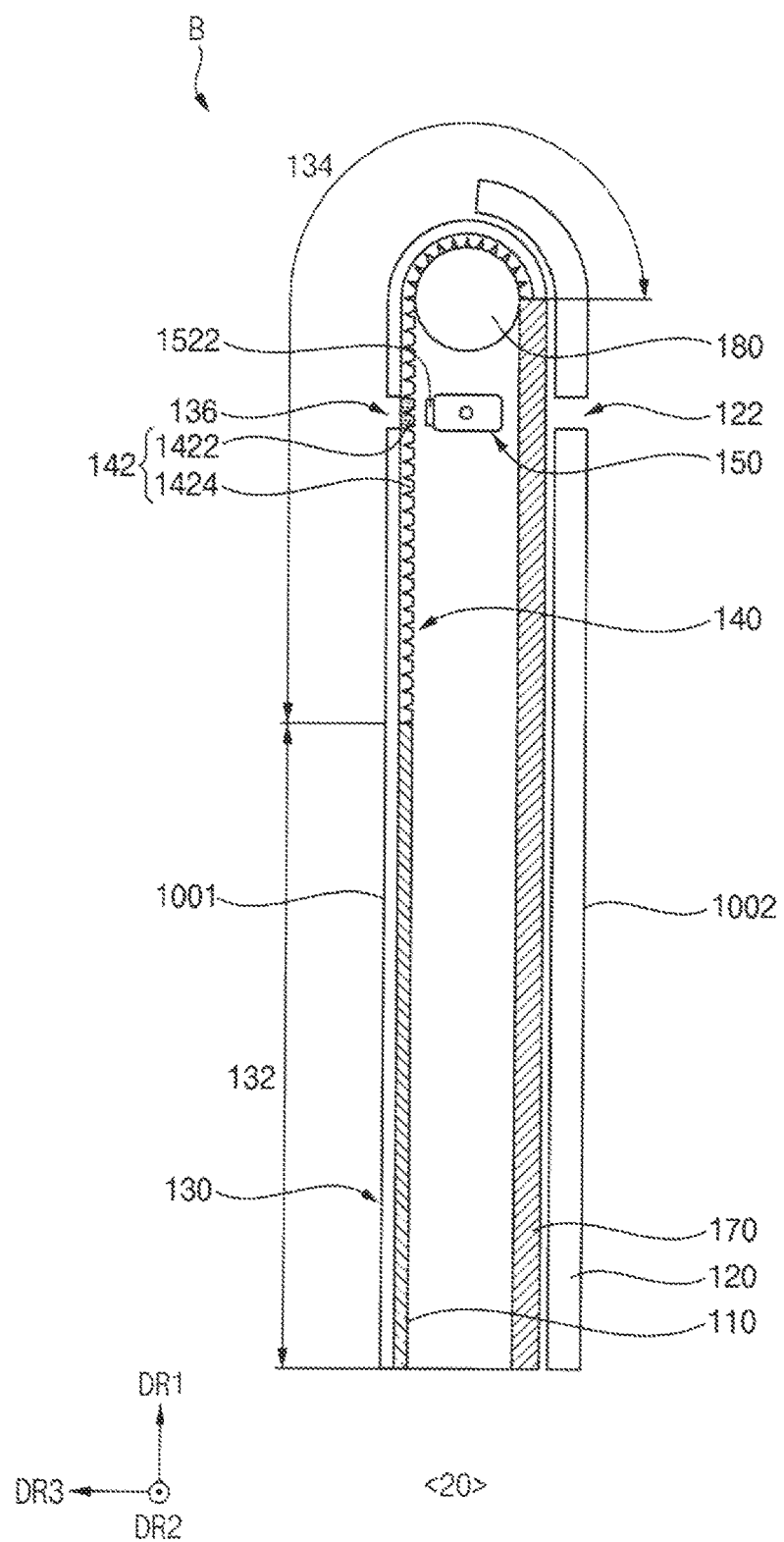
FIG. 5 is an enlarged cross-sectional view illustrating an area "B" of FIG. 3B.
Figure 6:
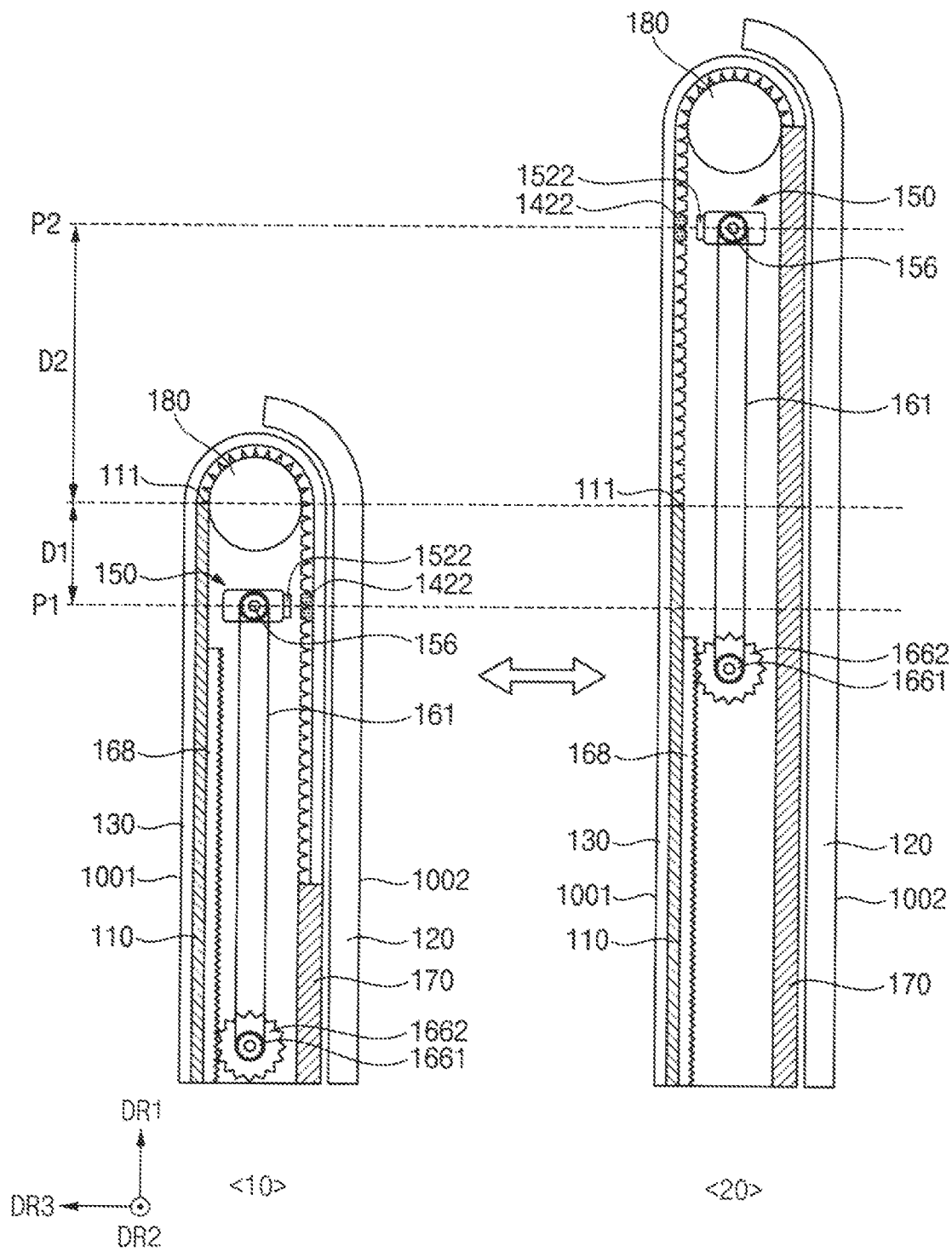
FIGS. 6 and 7 are example views for explaining an operation of moving and rotating a camera module according to an embodiment.
Figure 7:
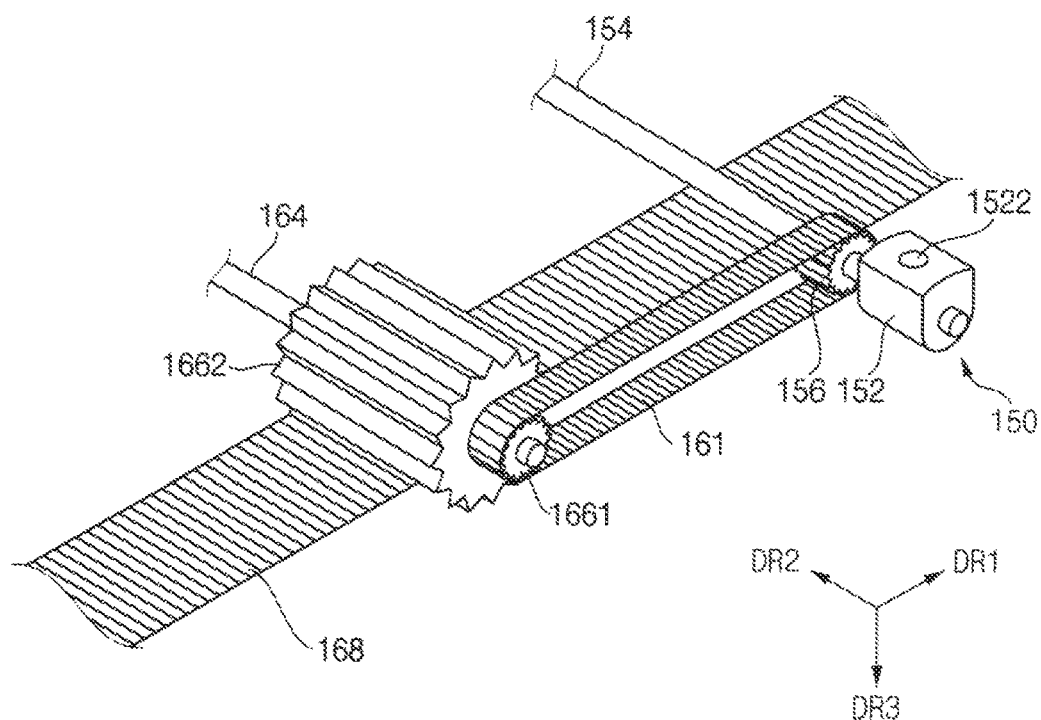

FIGS. 1A and 1B are front views illustrating an electronic device according to an embodiment. FIGS. 2A and 2B are rear views illustrating an electronic device according to an embodiment. FIGS. 3A and 3B are side views illustrating an electronic device according to an embodiment. FIG. 4 is an enlarged cross-sectional view illustrating an area "A" of FIG. 3A. FIG. 5 is an enlarged cross-sectional view illustrating an area "B" of FIG. 3B. FIGS. 6 and 7 are example views for explaining an operation of moving and rotating a camera module according to an embodiment.

Referring to FIGS. 1A, 1B, 2A, 2B, 3A, 3B, 4, 5, 6 and 7, an electronic device 100 according to an embodiment may include a first plate 110, a second plate 120, a camera module 150, and a flexible display 130.

The second plate 120 may be disposed to face the first plate 110. The second plate 120 may be configured to be movable in a first direction DR1 with respect to the first plate 110. For example, the second plate 120 may be configured to be movable between a first state 10 and a second state 20 in the first direction DR1 and a direction opposite to the first direction DR1 with respect to the first plate 110. For example, as shown in FIGS. 1A, 2A and 3A, the first state 10 may be a state in which the second plate 120 is closed with respect to the first plate 110. For example, as shown in FIGS. 1B, 2B, and 3B, the second state 20 may be a state in which the second plate 120 is opened with respect to the first plate 110.

The camera module 150 may be disposed between the first plate 110 and the second plate 120. The camera module 150 may include a lens 1522. In an embodiment, the camera module 150 may be rotated in response to a state transition of the second plate 120 such that the lens 1522 faces a front surface 1001 of the electronic device 100 or a rear surface 1002 of the electronic device 100. Accordingly, image capturing of the front and rear of the electronic device 100 may be performed using a single camera module 150.

In one example, as shown in FIG. 4, in the first state 10, the lens 1522 may locate along the third direction DR3. That is, one end of the lens 1522 may face the rear surface 1002 of the electronic device 100. In another example, as shown in FIG. 5, in the second state 20, the lens 1522 may locate along the third direction DR3. That is, one end of the lens 1522 may face the front surface 1001 of the electronic device 100. In other words, when the second plate 120 is transitioned from the first state 10 to the second state 20, the camera module 150 may be rotated such that the lens 1522 faces from the rear surface 1002 of the electronic device 100 to the front surface 1001 of the electronic device 100. In addition, when the second plate 120 is transitioned from the second state 20 to the first state 10, the camera module 150 may be rotated such that the lens 1522 faces from the front surface 1001 of the electronic device 100 to the rear surface 1002 of the electronic device 100.

In an embodiment, the camera module 150 may be moved in the first direction DR1 with respect to the first plate 110 in response to the state transition of the second plate 120.

For example, as shown in FIG. 6, in the first state 10, the camera module 150 may be positioned at a first position P1 in the first direction DR1 with respect to the first plate 110. The first position P1 may be spaced apart from an end portion 111 of the first plate 110 by a first distance D1 in a direction opposite to the first direction DR1. For example, in the second state 20, the camera module 150 may be positioned at a second position P2 in the first direction DR1 with respect to the first plate 110. The second position P2 may be spaced apart from the end portion 111 of the first plate 110 by a second distance D2 in the first direction DR1. That is, the second position P2 may be spaced apart from the first position P1 by "D1+D2" in the first direction DR1. "D1+D2" may be a distance the second plate 120 moves in the first direction DR1 with respect to the first plate 110 when the second plate 120 transitions from the first state 10 to the second state 20.

That is, the camera module 150 may be rotated such that the lens 1522 faces a front surface 1001 of the electronic device 100 or a rear surface 1002 of the electronic device 100 while moving in the first direction DR1 with respect to the first plate 110 in response to the state transition of the second plate 120.

As depicted in FIG. 7, in an embodiment, the camera module 150 may include a camera device 152, a first shaft 154 and a first gear 156. One end portion of the first shaft 154 may be rotatably connected to the second plate 120 (not shown herein). The camera device 152 may be disposed at the other end portion of the first shaft 154. The camera device 152 may include the lens 1522. The first shaft 154 may pass through the first gear 156. For example, the electronic device 100 may further include a second gear 1661, a third gear 1662, a chain 161, a second shaft 164, and a rail 168. The second gear 1661 may be spaced apart from the first gear 156. The chain 161 may rotatably connect the first gear 156 and the second gear 1661. An end portion of the second shaft 164 may be rotatably connected to the second plate 120 (not shown herein). The second shaft 164 may pass through the second gear 1661 and the third gear 1662. The first shaft 154 and the second shaft 164 may be moved in the first direction DR1 with respect to the first plate 110 in response to the movement of the second plate 120 in the first direction DR1 with respect to the first plate 110. Accordingly, the first gear 156, the second gear 1661, the third gear 1662, and the camera device 152 may be moved in the first direction DR1 with respect to the first plate 110. The rail 168 may disposed on the first plate 110, and may contact the third gear 1662. When the third gear 1662 is moved in the first direction DR1 in response to the movement of the second shaft 164 in the first direction DR1, the third gear 1662 may be rotated on the rail 168 in engagement with the rail 168. As the third gear 1662 is rotated, the second gear 1661 connected to the third gear 1662 through the second shaft 164 and the first gear 156 connected to the second gear 1661 through the chain 161 may be rotated. Accordingly, the camera device 152 connected to the first gear 156 through the first shaft 154 may be rotated. However, embodiments are not limited thereto.

In an embodiment, the second plate 120 may include a first aperture 122 overlapping the lens 1522. The first aperture 122 may support an angle of view of the lens 1522 facing the rear surface 1002 of the electronic device 100 in the first state 10. For example, in the first state 10, the lens 1522 may be exposed to the rear surface 1002 of the electronic device 100 through the first aperture 122. In the second state 20, a surface of the camera module 150 opposite to the lens 1522 or other members such as a third plate 170 may be exposed to the rear surface 1002 of the electronic device 100 through the first aperture 122.

At least a portion of the flexible display 130 may be exposed through the front surface 1001 of the electronic device 100. For example, as shown in FIGS. 1A and 1B, when the second plate 120 transitions from the first state 10 to the second state 20, a front display area of the flexible display 130 exposed through the front surface 1001 of the electronic device 100 may be expanded by an area EA having a specified area.

In one embodiment, the flexible display 130 may include a planar portion 132 and a bendable portion 134.

The planar portion 132 may be disposed on the first plate 110, and may overlap the first plate 110. For example, the planar portion 132 may extend across at least a portion of a front surface of the first plate 110, and an extended portion may be mounted on the front surface of the first plate 110.

The bendable portion 134 may extend from the planar portion 132. For example, as shown in FIG. 4, in the first state 10, the bendable portion 134 may extend from the planar portion 132 to a space between the first plate 110 and the second plate 120. In other words, when the second plate 120 transitions from the second state 20 to the first state 10, a portion of the bendable portion 134 may be led into the space between the first plate 110 and the second plate 120. For example, as shown in FIG. 5, in the second state 20, the portion of the bendable portion 134 may be led out of the space between the first plate 110 and the second plate 120. The portion of the bendable portion 134 led out of the space between the first plate 110 and the second plate 120 may substantially form a plane on the front surface 1001 of the electronic device 100. Accordingly, when the second plate 120 transitions from the first state 10 to the second state 20, the front display area of the flexible display 130 exposed through the front surface 1001 of the electronic device 100 may be expanded by an area EA having a specified area.

In one embodiment, the flexible display 130 may include a second aperture 136 overlapping the lens 1522. For example, the second aperture 136 may be formed on the bendable portion 134. The second aperture 136 may support an angle of view of the lens 1522 facing the front surface 1001 of the electronic device 100 in the second state 20. For example, in the first state 10, the second aperture 136 may be led into the space between the first plate 110 and the second plate 120. Accordingly, as shown in FIG. 1A, in the first state 10, the second aperture 136 may not be exposed to the front surface 1001 of the electronic device 100. In the second state 20, the second aperture 136 may be led out of the space between the first plate 110 and the second plate 120. Accordingly, as shown in FIG. 1B, in the second state 20, the second aperture 136 may be exposed on the front surface 1001 of the electronic device 100. Accordingly, the lens 1522 may be exposed to the front surface 1001 of the electronic device 100 through the second aperture 136.

In an embodiment, the electronic device 100 may further include a roller 180 and a multi-joint module 140. The roller 180 and the multi-joint module 140 may guide the inflow or outflow of the bendable portion 134 to be led into or out of the space between the first plate 110 and the second plate 120.

In an embodiment, the roller 180 may be disposed on an end portion of the second plate 120. For example, a length of the roller 180 in a second direction DR2 perpendicular to the first direction DR1 may correspond to a length of the second plate 120 in the second direction DR2. For example, the roller 180 may have a shape similar to a cylinder extending in the second direction DR2.

In an embodiment, the roller 180 may be moved in the first direction DR1 with respect to the first plate 110 in response to the movement of the second plate 120 in the first direction DR1 with respect to the first plate 110. For example, the roller 180 may be rotatably connected to the end portion of the second plate 120. When a state of the second plate 120 is transitioned, the roller 180 may guide or support the movement of the multi-joint module 140 and the bendable portion 134 of the flexible display 130 connected to the multi-joint module 140.

The multi-joint module 140 may overlap at least a portion of the bendable portion 134 of the flexible display 130. The multi-joint module 140 may be connected to a rear surface of the bendable portion 134. For example, an end portion of the multi-joint module 140 may be connected to the end portion 111 of the first plate 110, and the other end of the multi-joint module 140 may be connected to the third plate 170.

The multi-joint module 140 may guide the movement of the bendable portion 134 of the flexible display 130. When the bendable portion 134 is moved along a curved space by the support of the roller 180, the bendable portion 134 may be moved while maintaining a smooth shape by the multi-joint module 140.

The multi-joint module 140 may include a plurality of segment members 142 as shown in FIG. 4. For example, each of the plurality of segment members 142 may extend in the second direction DR2 perpendicular to the first direction DR1. The plurality of segment members 142 may be arranged in the first direction DR1. Accordingly, the multi-joint module 140 may be easily bent in a curved shape along an outer circumferential surface of the roller 180.

In an embodiment, the plurality of segment members 142 may include at least one opening segment member 1422 and a plurality of segment members 1424 disposed outside the opening segment member 1422. The opening segment member 1422 may overlap the lens 1522 of the camera module 150, and may include an opening. The opening segment member 1422 may overlap the lens 1522 in the first state 10 and the second state 20. The opening may overlap the lens 1522 in the first state 10 and the second state 20.

In an embodiment, the opening segment member 1422 may be moved in the first direction DR1 with respect to the first plate 110 in response to the state transition of the second plate 120. For example, as shown in FIG. 6, in the first state 10, the opening segment member 1422 may be positioned at the first position P1 in the first direction DR1 with respect to the first plate 110. Accordingly, the opening segment member 1422 may overlap the lens 1522 of the camera module 150 in the first state 10. For example, in the second state 20, the opening segment member 1422 may be positioned at the second position P2 in the first direction DR1 with respect to the first plate 110. Accordingly, the opening segment member 1422 may overlap the lens 1522 of the camera module 150 in the second state 20.

For example, in the first state 10, the opening segment member 1422 may be located on the rear surface 1002 of the electronic device 100. As described above, in the first state 10, the camera module 150 may be disposed such that the lens 1522 faces the rear surface 1002 of the electronic device 100. Accordingly, the lens 1522 may overlap the opening segment member 1422, and may be disposed to face the opening segment member 1422. For example, in the second state 20, the opening segment member 1422 may be located on the front surface 1001 of the electronic device 100. As described above, in the second state 20, the camera module 150 may be disposed such that the lens 1522 faces the front surface 1001 of the electronic device 100. Accordingly, the lens 1522 may overlap the opening segment member 1422, and may be disposed to face the opening segment member 1422.

In an embodiment, the electronic device 100 may further include a third plate 170 which is connected to the multi-joint module 140. The third plate 170 may be disposed between the first plate 110 and the second plate 120. The third plate 170 may be movable in the first direction DR1 with respect to the first plate 110 or the second plate 120. The third plate 170 may assist the movement of the bendable portion 134 and the multi-joint module 140. In another embodiment, the third plate 170 may be omitted.

Figure 8:
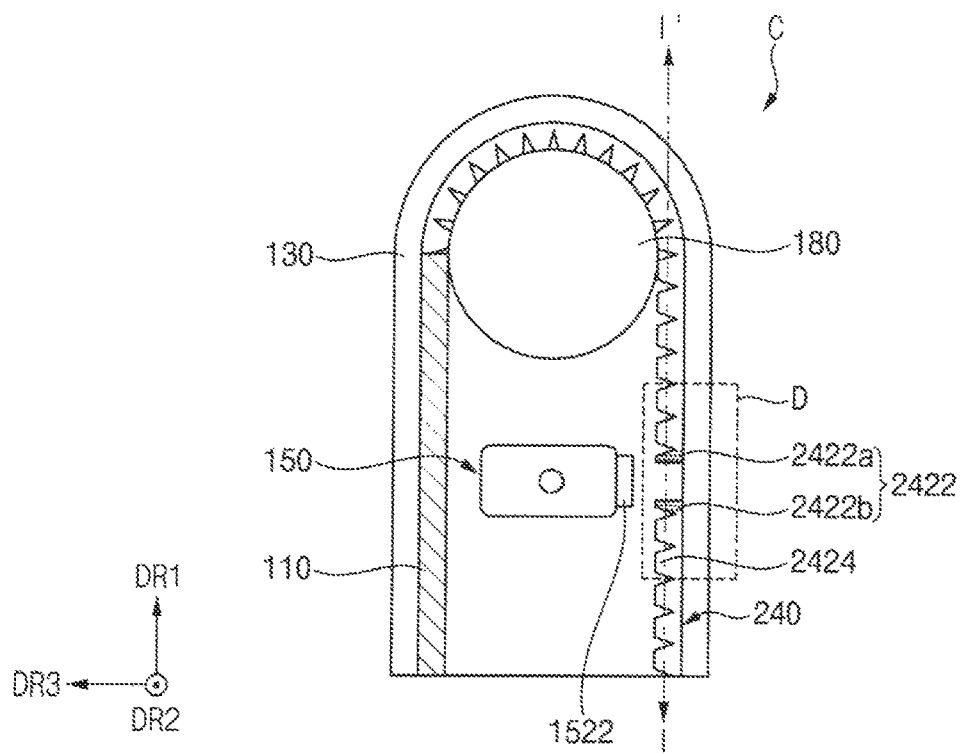
FIG. 8 is an enlarged cross-sectional view illustrating an example of an area "C" of FIG. 4.
Figure 9:
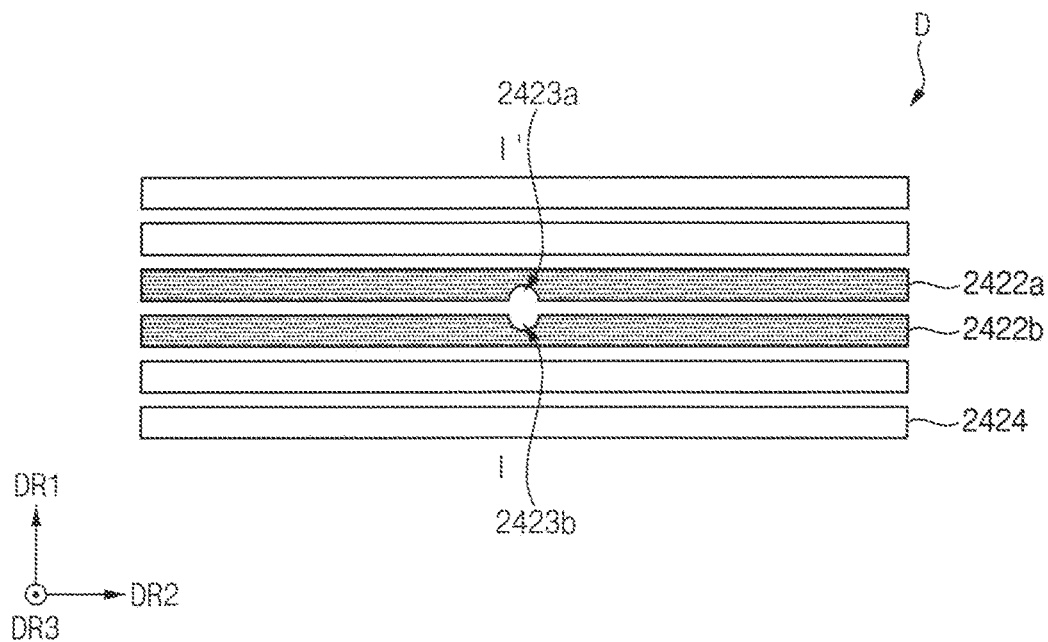
FIG. 9 is a cross-sectional view illustrating an area "D" of FIG. 8 taken along line I-I'.
Figure 10:
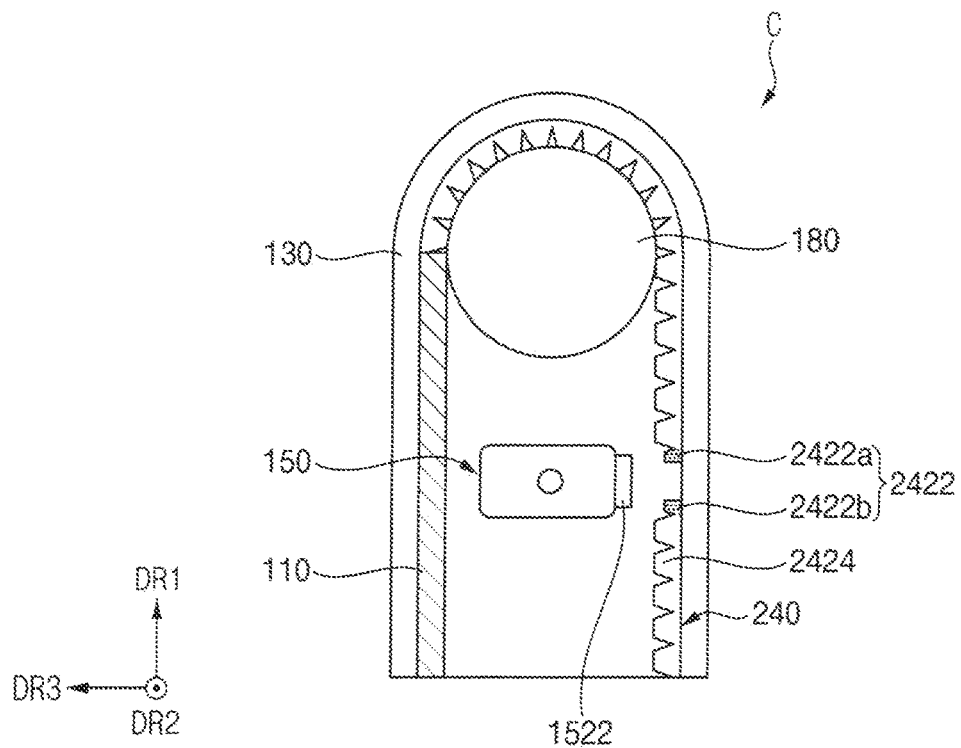
FIG. 10 is an enlarged cross-sectional view illustrating another example of the area "C" of FIG. 4.

FIG. 8 is an enlarged cross-sectional view illustrating an example of an area "C" of FIG. 4. FIG. 9 is a cross-sectional view illustrating an area "D" of FIG. 8 taken along line I-I'. FIG. 10 is an enlarged cross-sectional view illustrating another example of the area "C" of FIG. 4.

Referring to FIGS. 4, 8, and 9, the multi-joint module 240 may include a plurality of segment members. The plurality of segment members may include opening segment members 2422 and a plurality of segment members 2424 disposed outside the opening segment members 2422. The opening segment members 2422 may include a first opening segment member 2422a including a first opening 2423a and a second opening segment member 2422b including a second opening 2423b. The first opening segment member 2422a and the second opening segment member 2422b may be disposed adjacent to each other.

In an embodiment, a length of the first opening 2423a in the first direction DR1 may be less than a length of the first opening segment member 2422a in the first direction DR1. That is, the first opening 2423a may be formed on a part of the first opening segment member 2422a in the first direction DR1. For example, the length of the first opening 2423a in the first direction DR1 may be half of the length of the first opening segment member 2422a in the first direction DR1.

A length of the second opening 2423b in the first direction DR1 may be less than a length of the second opening segment member 2422b in the first direction DR1. That is, the second opening 2423b may be formed on a part of the second opening segment member 2422b in the first direction DR1. For example, the length of the second opening 2423b in the first direction DR1 may be half of the length of the second opening segment member 2422b in the first direction DR1.

In an embodiment, the first opening 2423a and the second opening 2423b may be symmetrical to each other. For example, as shown in FIG. 9, the first opening 2423a and the second opening 2423b may have semicircular cross-sectional shapes symmetrical each other along the second direction DR2. For another example, the first opening 2423a and the second opening 2423b may have polygonal cross-sectional shapes symmetrical to each other along the second direction DR2. In the first state 10 and the second state 20, the lens 1522 of the camera module 150 may be exposed to the outside through the first opening 2423a and the second opening 2423b. For example, the sizes of the first opening 2423a and the second opening 2423b may be determined according to the sizes of the lens 1522.

Referring to FIGS. 4 and 10, in an embodiment, a thickness of each of the first and second opening segment members 2422a and 2422b in the third direction DR3 may be less than a thickness of each of the segment members 2424 outside the opening segment members 2422 in the third direction DR3. The third direction DR3 may be perpendicular to the first direction DR1 and the second direction DR2. Accordingly, the camera module 150 may be easily rotated in response to the state transition of the second plate 120. In another embodiment, as shown in FIG. 9, the thickness of each of the first and second opening segment members 2422a and 2422b in the third direction DR3 may be substantially the same as the thickness of each of the segment members 2424 outside the opening segment members 2422 in the third direction DR3.

Figure 11:
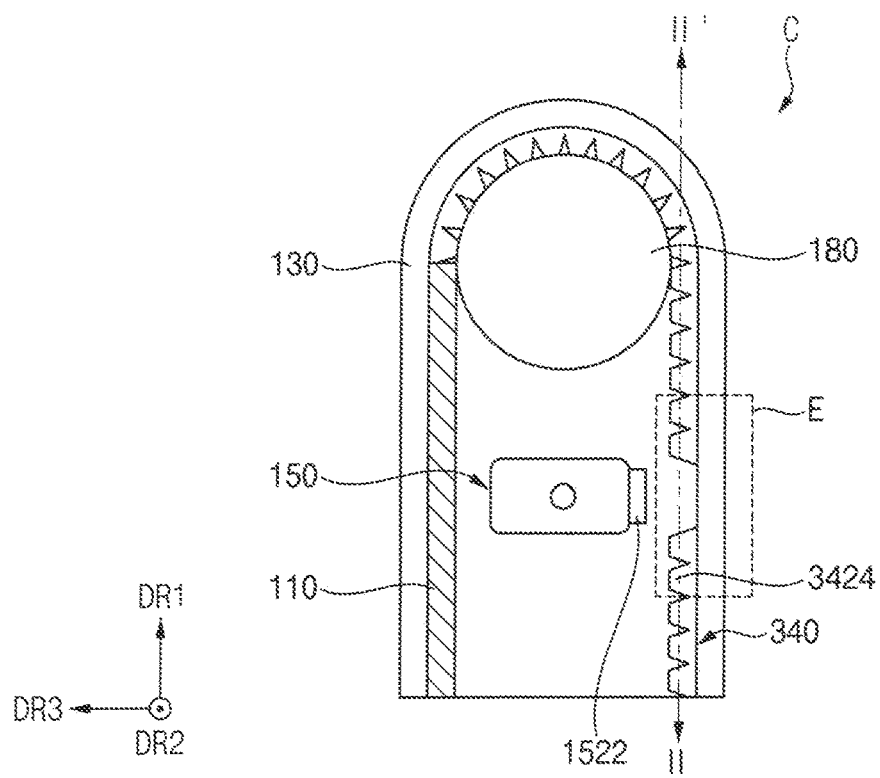
FIG. 11 is an enlarged cross-sectional view illustrating still another example of the area "C" of FIG. 4.
Figure 12:
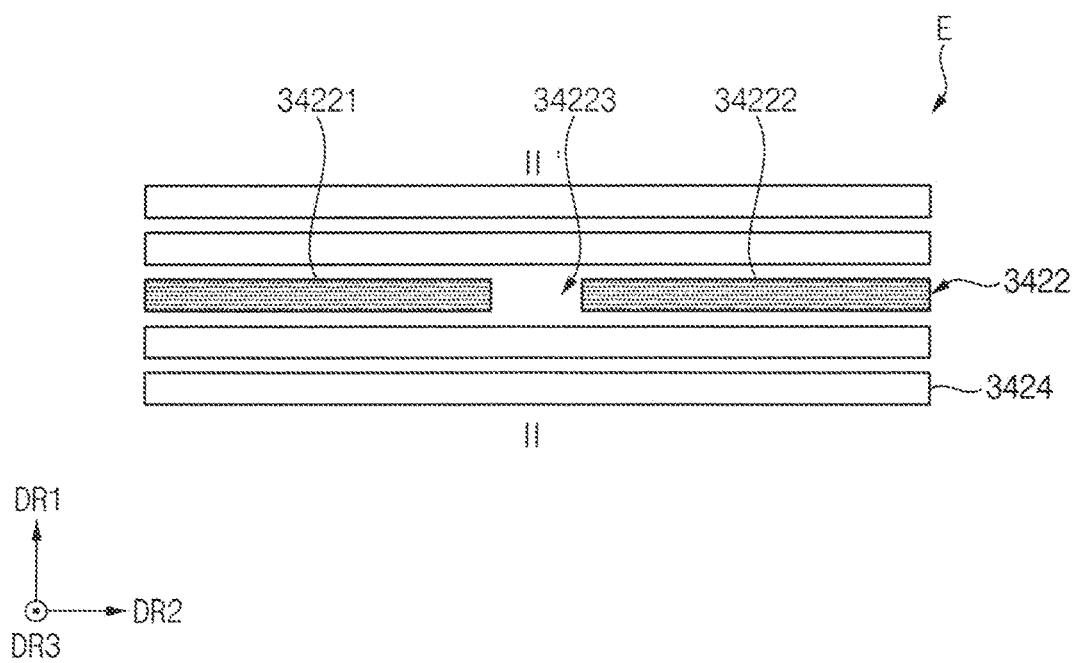
FIG. 12 is a cross-sectional view illustrating an example of an area "E" of FIG. 11 taken along line II-II'.
Figure 13:
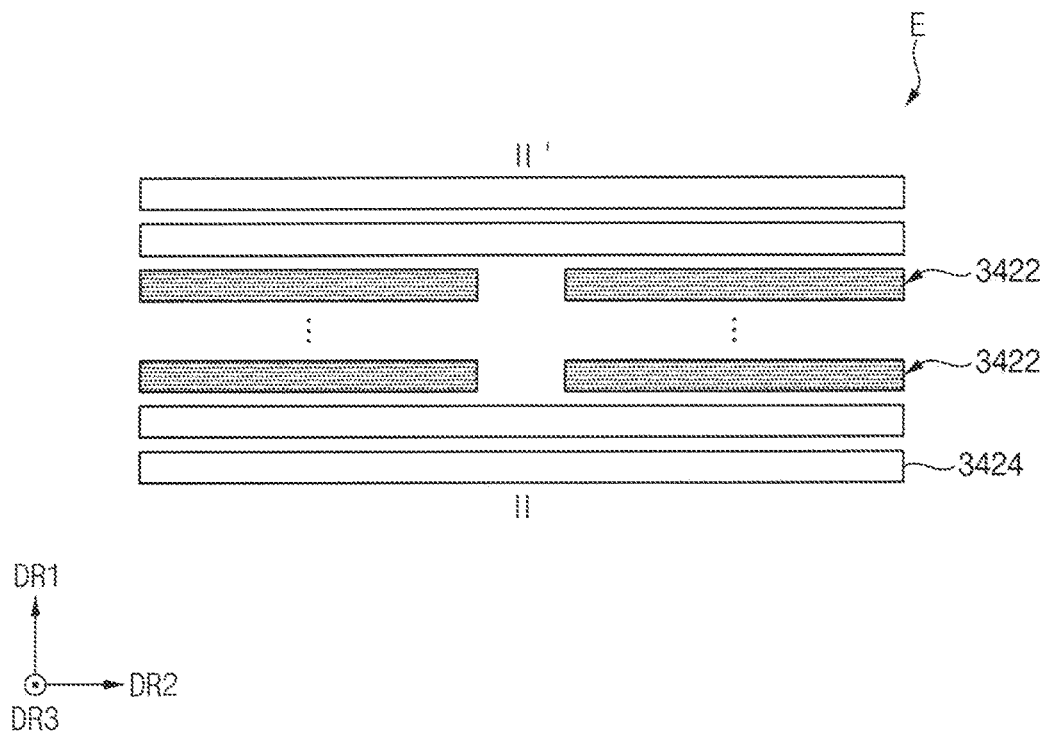
FIG. 13 is a cross-sectional view illustrating another example of the area "E" of FIG. 11 taken along line II-II'.

FIG. 11 is an enlarged cross-sectional view illustrating still another example of the area "C" of FIG. 4. FIG. 12 is a cross-sectional view illustrating an example of an area "E" of FIG. 11 taken along line II-II'. FIG. 13 is a cross-sectional view illustrating another example of the area "E" of FIG. 11 taken along line II-II'.

Referring to FIGS. 4, 11, and 12, the multi-joint module 340 may include a plurality of segment members. In an embodiment, the plurality of segment members may include an opening segment member 3422 and segment members 3424 outside the opening segment member 3422. The opening segment member 3422 may include a first portion 34221 and a second portion 34222 spaced apart from the first portion 34221. The opening 34223 may be located between the first portion 34221 and the second portion 34222. For example, a width of the opening 34223 in the second direction DR2 may be determined according to the size of the lens 1522.

Referring to FIGS. 4, 11, and 13, in another embodiment, the plurality of segment members may include a plurality of opening segment members 3422. Each of the plurality of opening segment members 3422 may include a first portion, a second portion spaced apart from the first portion, and an opening located between the first portion and the second portion. For example, the number of the plurality of opening segment members 3422 and a width of the opening of each of the plurality of opening segment members 3422 in the second direction DR2 may be determined according to the size of the lens 1522.

Figure 14:
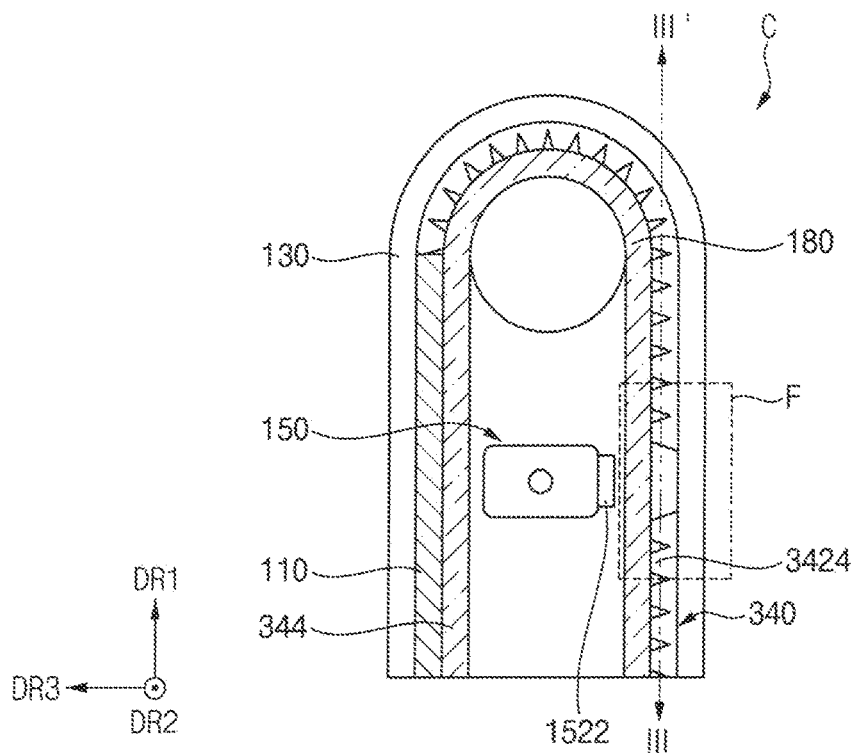
FIG. 14 is an enlarged cross-sectional view illustrating still another example of the area "C" of FIG. 4.
Figure 15:
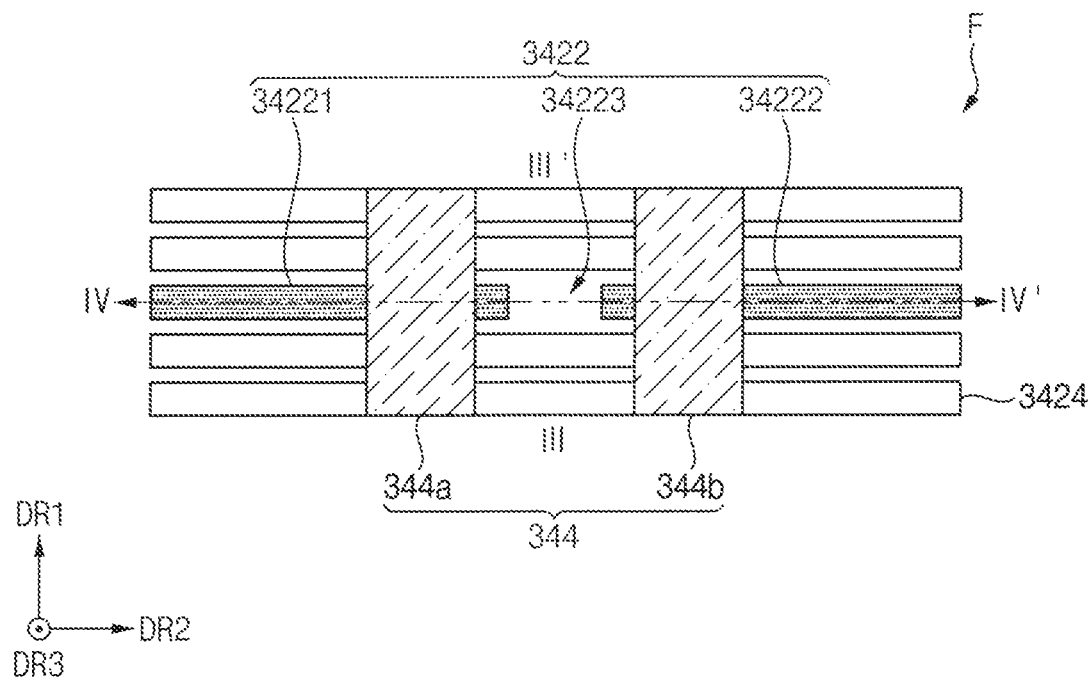
FIG. 15 is a cross-sectional view illustrating an area "F" of FIG. 14 taken along line III-III'.
Figure 16:
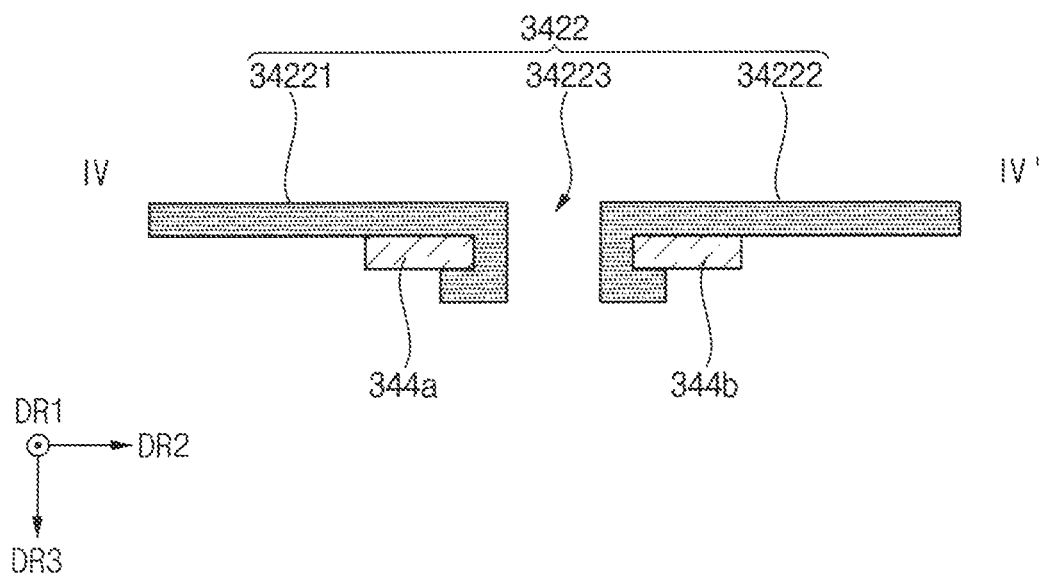
FIG. 16 is a cross-sectional view illustrating an example taken along line IV-IV' of FIG. 15.
Figure 17:
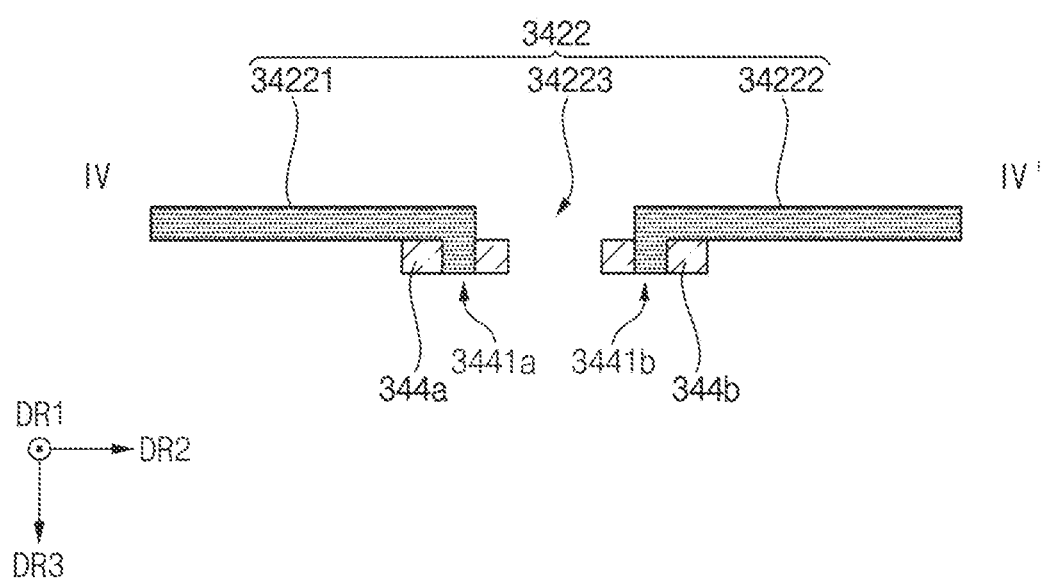
FIG. 17 is a cross-sectional view illustrating another example taken along line IV-IV' of FIG. 15.

FIG. 14 is an enlarged cross-sectional view illustrating still another example of the area "C" of FIG. 4. FIG. 15 is a cross-sectional view illustrating an area "F" of FIG. 14 taken along line III-III'. FIG. 16 is a cross-sectional view illustrating an example taken along line IV-IV' of FIG. 15. FIG. 17 is a cross-sectional view illustrating another example taken along line IV-IV' of FIG. 15.

Referring to FIGS. 14, 15, and 16, in an embodiment, the multi-joint module 340 may further include at least one support member 344 disposed on the plurality of segment members. The support member 344 may extend in the first direction DR1.

In one embodiment, the support member 344 may include a first support member 344a and a second support member 344b. The first support member 344a and the second support member 344b may be spaced apart from each other in the second direction DR2. For example, the first support member 344a may overlap the first portion 34221 of the opening segment member 3422. The second support member 344b may overlap the second portion 34222 of the opening segment member 3422. Each of the first and second support members 344a and 344b may support each of the first and second portions 34221 and 34222 of the opening segment member 3422.

In an embodiment, as shown in FIG. 16, one end of the first portion 34221 disposed adjacent to the opening 34223 may surround the first support member 344a. Accordingly, the first portion 34221 of the opening segment member 3422 may be connected to the first support member 344a. One end of the second portion 34222 disposed adjacent to the opening 34223 may surround the second support member 344b. Accordingly, the second portion 34222 of the opening segment member 3422 may be connected to the second support member 344b.

Referring to FIGS. 14, 15, and 17, in another embodiment, a first hole 3441a is formed in the first support member 344a. The end of the first portion 34221 disposed adjacent to the opening 34223 may be inserted into the first hole 3441a. Accordingly, the first portion 34221 of the opening segment member 3422 may be connected to the first support member 344a.

A second hole 3441b is formed in the second support member 344b. The end portion of the second portion 34222 disposed adjacent to the opening 34223 may be inserted into the second hole 3441b. Accordingly, the second portion 34222 of the opening segment member 3422 may be connected to the second support member 344b.

Although certain embodiments and implementations have been described herein, other embodiments and modifications will be apparent from this description. Accordingly, the present disclosure is not limited to such embodiments, but rather to the broader scope of the appended claims and various obvious modifications and equivalent arrangements as would be apparent to a person of ordinary skill in the art.

What is claimed is:

1. An electronic device comprising:
   a first plate;
   a second plate facing the first plate and continuously moving between a first state and a second state with respect to the first plate;
   a camera module including a lens and disposed between the first plate and the second plate;
   a flexible display including a planar portion and a bendable portion, wherein the planar portion is disposed on the first plate, and wherein the bendable portion extends from the planar portion; and
   a multi-joint module including a plurality of segment members and overlapping the bendable portion of the flexible display, wherein the camera module is configured to:
   move in a first direction with respect to the first plate in response to a state transition of the second plate, and
   rotate in response to the state transition of the second plate such that the lens faces a front surface of the electronic device or a rear surface of the electronic device, and wherein the plurality of segment members includes at least one opening segment member, an opening is formed in the opening segment member, and the opening segment member overlaps the lens in the first state and the second state.

2. The electronic device of claim 1, wherein the opening segment member is configured to move in the first direction with respect to the first plate in response to the state transition of the second plate.

3. The electronic device of claim 2, wherein the camera module is located at a first position in the first direction with respect to the first plate in the first state, and is located at a second position in the first direction with respect to the first plate in the second state, and
wherein the lens faces the rear surface of the electronic device in the first state, and faces the front surface of the electronic device in the second state.

4. The electronic device of claim 3, wherein the second position is spaced apart from the first position by a spacing distance, and wherein the spacing distance is a distance which the second plate moves with respect to the first plate when the second plate transits from the first state to the second state.

5. The electronic device of claim 3, wherein the opening segment member is located at the first position in the first state, and is located at the second position in the second state.

6. The electronic device of claim 5, wherein the opening segment member is located on the rear surface of the electronic device, and is located on the front surface of the electronic device.

7. The electronic device of claim 1, wherein the opening segment member includes:
a first opening segment member wherein a first opening is formed in the first opening segment member; and
a second opening segment member disposed adjacent to the first opening segment member, and a second opening is formed in the second opening segment member.

8. The electronic device of claim 7, wherein a length of the first opening in the first direction is less than a length of the first opening segment member in the first direction, and
wherein a length of the second opening in the first direction is less than a length of the second opening segment member in the first direction.

9. The electronic device of claim 1, wherein the opening segment member includes a first portion and a second portion spaced apart from the first portion, and
wherein the opening is located between the first portion and the second portion.

10. The electronic device of claim 9, wherein the multi-joint module further includes at least one support member disposed on the plurality of the segment members.

11. The electronic device of claim 10, wherein the plurality of segment members are arranged in the first direction, and
wherein the support member extends in the first direction.

12. The electronic device of claim 11, wherein the support member includes:
a first support member overlapping the first portion of the opening segment member; and
a second support member overlapping the second portion of the opening segment member.

13. The electronic device of claim 12, wherein one end of the first portion of the opening segment member disposed adjacent to the opening surrounds the first support member, and wherein one end of the second portion of the opening segment member disposed adjacent to the opening surrounds the second support member.

14. The electronic device of claim 12, wherein a first hole is formed in the first support member includes, wherein an end portion of the first portion of the opening segment member adjacent to the opening is inserted into the first hole, and
wherein a second hole is formed in the second support member, wherein an end portion of the second portion of the opening segment member adjacent to the opening is inserted into the second hole.

15. The electronic device of claim 1, wherein the plurality of segment members are arranged in the first direction.

16. The electronic device of claim 15, wherein each of the plurality of segment members extends in a second direction which is substantially perpendicular to the first direction.

17. The electronic device of claim 16, wherein a thickness of the opening segment member in a third direction substantially perpendicular to the first direction and the second direction is less than a thickness of a segment member of the segment members outside the opening segment member in the third direction.

18. The electronic device of claim 1, wherein the bendable portion of the flexible display is located between the first plate and the second plate in the first state.

19. The electronic device of claim 1, wherein the second plate includes a first aperture overlapping the lens.

20. The electronic device of claim 1, wherein the bendable portion of the flexible display includes a second aperture overlapping the lens.

* * * * *